United States Patent [19]
Orriss

[11] Patent Number: 5,425,090
[45] Date of Patent: Jun. 13, 1995

US005425090A

[54] SYSTEM AND METHOD FOR PROVIDING ADVANCED INTELLIGENT NETWORK SERVICES

[75] Inventor: Richard A. Orriss, Colts Neck, N.J.

[73] Assignee: Bell Communications Research, Inc., Livingston, N.J.

[21] Appl. No.: 163,316

[22] Filed: Dec. 7, 1993

[51] Int. Cl.6 .............................................. H04M 3/42
[52] U.S. Cl. ..................................... 379/201; 379/207; 379/112; 379/230
[58] Field of Search .................. 379/201, 207, 88, 115, 379/213, 230, 228, 229, 112, 220, 221; 395/600, 500; 370/110.1, 68.1

[56] References Cited

U.S. PATENT DOCUMENTS

| | | | |
|---|---|---|---|
| 5,008,929 | 4/1991 | Olsen et al. | 379/115 |
| 5,089,954 | 2/1992 | Rago | 395/600 |
| 5,212,789 | 5/1993 | Rago | 395/600 |
| 5,251,255 | 10/1993 | Epley | 379/207 |
| 5,259,026 | 11/1993 | Johnson | 379/207 |

Primary Examiner—James L. Dwyer
Assistant Examiner—Scott Wolinsky
Attorney, Agent, or Firm—Leonard Charles Suchyta

[57] ABSTRACT

In a telephone network, customized advanced intelligent network (AIN) services are provided to standard IN/1 "800" service customers. An IN/1 service switching point (IN/1 SSP) receives a call directed to the standard IN/1 "800" service customer, and generates an "800" query to an "800" services data base. An "800" service control point ("800" SCP) generates an "800" response containing a carrier identification code, and the IN/1 SSP routes the call via a trunk group designated by the carrier identification code. An AIN-equipped service switching point (AIN SSP) then generates an AIN query to an AIN services data base. In response, an AIN-equipped service control point (AIN SCP) executes AIN service records corresponding to the standard IN/1 "800" service customer to generate an AIN response containing call processing instructions. The AIN SSP then uses the call processing instructions to complete the call.

19 Claims, 5 Drawing Sheets

SYSTEM AND METHOD FOR PROVIDING ADVANCED INTELLIGENT NETWORK SERVICES

BACKGROUND OF THE INVENTION

The present invention relates generally to the field of customized telecommunication services, and more specifically to providing customized telephone services made available by the next-generation Advanced Intelligent Network (AIN) to customers receiving standard services from existing telephone facilities.

The telephone network presently is undergoing a transition from the intelligent network (IN/1) that has been in place for many years to an AIN. The evolving AIN provides both advanced service features and flexible service provisioning capabilities that make it very beneficial to customers, particularly those with unique service requirements. Because implementation of the AIN is an ongoing process, however, many of the customized telephone services to be provided by the AIN presently are not available to customers receiving standard services from the existing IN/1 facilities. For example, customers receiving standard "800" services from IN/1 facilities may desire customized AIN features that are not yet implemented for "800" customers. Although customers presently have the ability to designate an interexchange carrier (IC) and routing numbers (either POTS numbers or dialed "800" numbers) with some flexibility, e.g., time of day or day of week, more dynamic service features are unavailable. Desirable features that are not available include caller interaction with options designated by the "800" customer, and the ability to make routing decisions based on the states of network resources such as customer terminating facilities or IC trunking facilities. These types of dynamic features are, however, increasingly available with the AIN.

A natural desire of "800" customers is to have available, at reasonable cost and in timely fashion, the type of dynamic service features available with the AIN. However, immediate implementation of the complete and ubiquitous AIN is not practical. Unfortunately, expansion of the standard IN/1 "800" service to deliver AIN services will require expensive and time-consuming switch modifications, as well as modifications to the existing IN/1 "800" service control applications and operations support system. Accordingly, it is desirable to provide a means for bridging the gap between existing "800" services supplied by the IN/1 and the evolving features made available by the AIN, without immediate expansion or modification of the existing IN/1 network systems.

DISCLOSURE OF THE INVENTION

In light of the foregoing, and in accordance with the present invention, there is provided, in a telephone network, a system and method for providing customized AIN services to standard IN/1 "800" service customers. The system and method of the present invention employ a double query architecture in which a first query made to a standard IN/1 "800" services data base yields instructions for generating a second query to an AIN services data base containing one or more AIN service records for the standard "800" service customer. A call directed to the "800" service customer can then be completed according to instructions contained in the customer's AIN service records, thereby providing advanced AIN features without the need for extensive modification of the existing IN/1 network systems.

Additional features and advantages of the invention will be set forth in part in the description that follows, and in part will be apparent from the description, or may be learned by practice of the invention. The objects and advantages of the invention will be realized and attained by the system and method particularly pointed out in the written description and claims hereof, as well as in the appended drawings.

To achieve the advantages of the invention and in accordance with the purpose of the invention, as embodied and broadly described herein, the present invention is, in a telephone network, a system for providing customized advanced intelligent network (AIN) services to standard intelligent network (IN/1) "800" service customers, the system comprising an IN/1-equipped service switching point (IN/1 SSP) for receiving a call directed to a standard IN/1 "800" service customer, an IN/1-equipped "800" service control point ("800" SCP) coupled to the IN/1 SSP, an AIN-equipped service switching point (AIN SSP) coupled to the IN/1 SSP, and an AIN-equipped service control point (AIN SCP) coupled to the AIN SSP, wherein the IN/1 SSP generates an "800" query in response to the received call, the "800" SCP generates, in response to the "800" query, an "800" response corresponding to the standard IN/1 "800" service customer, the AIN SSP generates an AIN query based on the "800" response, the AIN SCP generates, in response to the AIN query, an AIN response containing instructions for completing the call, and the AIN SSP completes the call according to the instructions contained in the AIN response.

In another aspect, the present invention is a method for providing, in a telephone network, customized advanced intelligent network (AIN) services to standard intelligent network (IN/1) "800" service customers, the method comprising the steps of receiving a call directed to a standard IN/1 "800" service customer, generating an "800" query in response to the received call, generating, in response to the "800" query, an "800" response including an identification code specified in an "800" service record corresponding to the standard IN/1 "800" service customer, routing the call via a trunk group designated by the identification code, generating an AIN query in response to the routing of the call, executing, in response to the AIN query, at least one AIN service record corresponding to the standard IN/1 "800" service customer, generating an AIN response including instructions based on the execution of the at least one AIN service record, and completing the call according to the instructions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate the preferred embodiments of the invention and together with the description serve to explain the principles of the invention.

BEST MODE FOR CARRYING OUT THE INVENTION

Reference will now be made in detail to the presently preferred embodiments of the invention, examples of which are illustrated in the accompanying drawings. Wherever possible, the same reference numbers will be used throughout the drawings to refer to the same or like parts.

Figure 1:
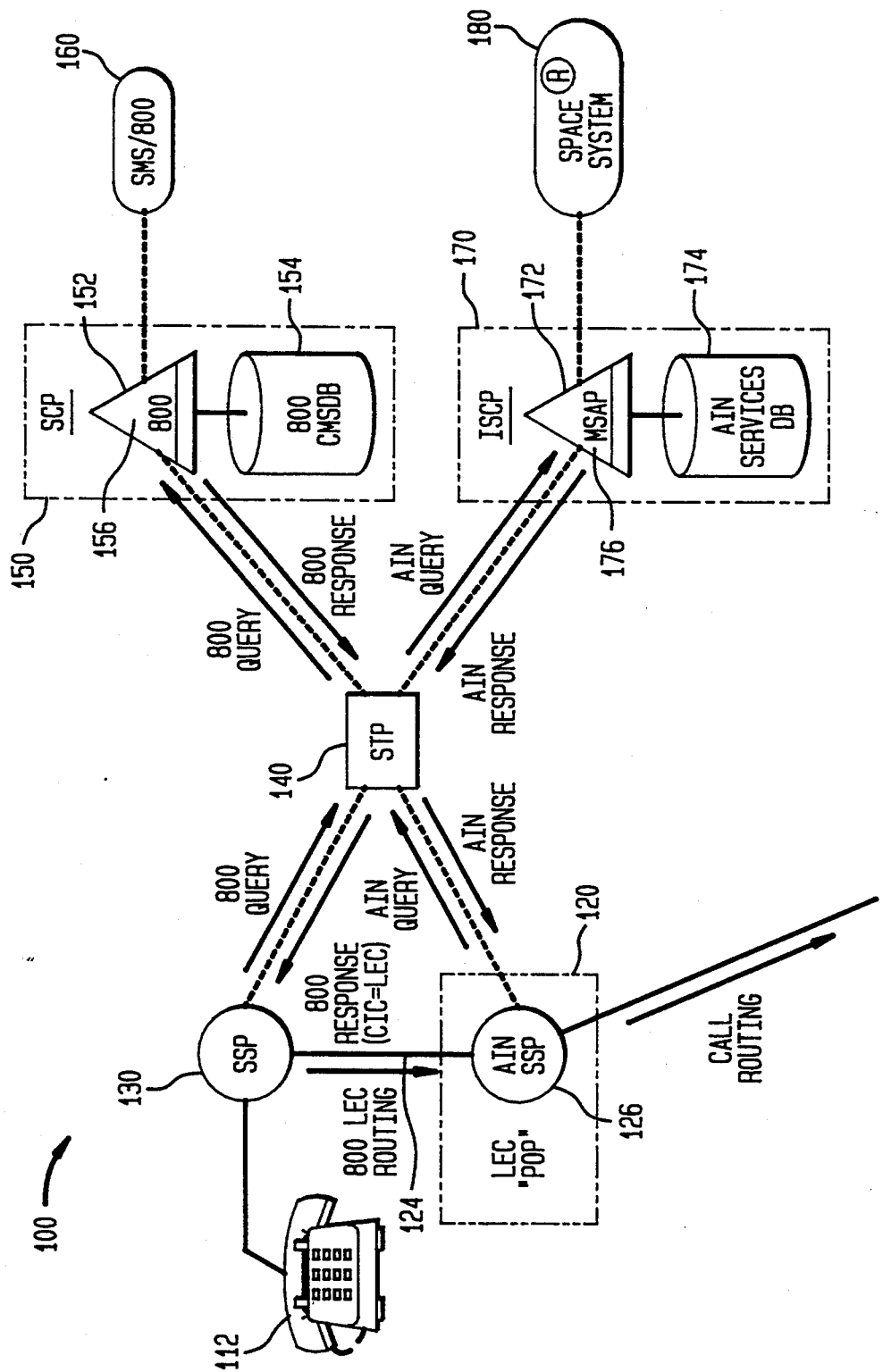
FIG. 1 is a block diagram of one embodiment of a system for providing customized AIN services to standard IN/1 "800" service customers.

A first exemplary embodiment of the system of the present invention is shown in FIG. 1 and is designated generally by reference numeral 100. As herein embodied and shown in FIG. 1, the system 100 employs a double query system architecture that includes a standard IN/1 service switching point (IN/1 SSP) 130 equipped with existing IN/1 call-triggering capabilities for processing telephone calls directed to "800" service customers.

When a telephone call having an "800" number is received at the IN/1 SSP 130 from telephone 112, the SSP 130 recognizes "800" service triggers within the call and generates an "800" query requesting instructions for completing the call. The IN/1 SSP 130 transmits the "800" query to a signal transfer point (STP) 140, which then transmits the "800" query to an "800" service control point ("800" SCP) 150.

The "800" SCP 150 includes a processor 152 and an "800" call management services data base (CMSDB) 154 containing an "800" service record for each customer. The processor 152 runs an IN/1 "800" service application program 156, such as the current SCP/800 application release, a proprietary software application owned by Bellcore. In response to the "800" query, processor 152, running application 156, locates in the "800" CMSDB 154 an "800" service record corresponding to the customer to whom the call is directed, and then executes the "800" service record to generate an "800" response containing instructions for completing the "800" call. The "800" SCP 150 transmits the "800" response to STP 140, which then transmits the "800" response to IN/1 SSP 130. Because processor 152 handles all of the "800" queries transmitted by SSP 130, all of the sophisticated network management controls provided by the SCP/800 application, such as "800" service call overload protection, can be maintained.

In the conventional IN/1, the SSP 130 routes the "800" call via an appropriate IN/1 trunk group (not shown) and completes the call according to the instructions contained in the "800" response generated by the "800" SCP 150. For example, the "800" response contains a carrier identification code (CIC), which may designate facilities corresponding to an IC or a local exchange carrier (LEC). The SSP 130 uses the CIC in the "800" response returned from the "800" SCP 150 to select an appropriate outgoing trunk group, which would normally correspond to an IC point-of-presence (POP). The SSP 130 then monitors whether an idle trunk can be found in the selected outgoing trunk group. If an idle trunk group is not available, the SSP 130 routes the call to reorder tone, providing an audible indication to the caller that the call cannot be completed due to network congestion. If an idle trunk is found, the SSP 130 signals the office at the other end of the trunk, normally an IC POP, that a call is being routed to it. The office then assumes responsibility for further call processing, ending the routing responsibility of the SSP 130 at this point.

In accordance with the present invention, however, the IN/1 SSP 130 routes the call to an AIN SSP 126 equipped with AIN call-triggering capabilities via trunk group 124. The SSP 130 routes to the AIN SSP 126 based on a turnaround record, an "800" service record contained in the "800" CMSDB 154. The turnaround record includes a CIC, associated with the LEC, that directs the SSP 130 to route via trunk group 124. A service management system (SMS) 160, running a service creation and management application, such as the current SMS/800 application release, a proprietary software application owned by Bellcore, is used to create a turnaround record in the "800" CMSDB 154 for each "800" customer desiring AIN services. In response to the "800" query, the "800" SCP processor 152, running the "800" service application 156, executes the turnaround record to generate an "800" response that includes the LEC CIC designating trunk group 124. The STP 140 receives the "800" response and transmits it to the IN/1 SSP 130, which then routes the call to the AIN SSP 126 via the trunk group 124 designated by the CIC. The AIN SSP 126 serves as a POP within the originating LATA for a particular LEC, and will be referred to as the LEC POP 120.

The AIN SSP 126, associated with the LEC POP 120, receives the call routed from IN/1 SSP 130, and launches the second query of the double query scheme, generating an AIN query with respect to the "800" service customer to whom the original call was directed. The AIN query contains information concerning the number of the calling party and the originally dialed "800" number. Thus, the AIN query specifies the "800" service customer by the use of the originally dialed "800" number, eliminating the administrative overhead required for a dual-numbering scheme. The AIN SSP 126 may be equipped with AIN call triggering capabilities as specified, for example, by the Ameritech Advanced Intelligent Network (AIN) 0.0 SSP Functional Specification (TR-OAT-00042) or the Bellcore Advanced Intelligent Network (AIN) 0.1 Switching Systems Generic Requirements (TR-NWT-001284). The AIN SSP 126 may launch the AIN query based on triggering criteria such as the "800" code or 800-NXX code of the originally dialed "800" number, or may employ an off-hook delay trigger to launch the AIN query only in response to calls routed from particular trunk groups. In either case, it is not necessary to convert the "800" number to a corresponding POTS number to carry out the AIN query.

The STP 140 transmits the AIN query to an AIN-equipped service control point 170, such as, for example, the integrated service control point (ISCP) developed by Bellcore. The ISCP 170 includes a processor 172 running an AIN services application 176, and an AIN services data base 174 containing one or more AIN service records for each "800" service customer. The SMS 180 is used to create and modify the AIN service records in AIN services data base 174 with a service creation and management application, such as the SPACE ® version 2.0 application. Thus, in the system 100 of the present invention, the record set for a particular customer includes both the turnaround record stored in the "800" services data base 154 and one or more AIN service records stored in the AIN services data base 174. The AIN services application 176 running on processor 172 may be, for example, the current Multi-Services Application Platform (MSAP) release, a proprietary software application owned by Bellcore. Use of the MSAP application is described in commonly assigned U.S. patent application Ser. No. 07/972,529, the content of which is hereby incorporated by reference.

In response to the AIN query generated by AIN-equipped SSP 126, ISCP processor 172 locates one or more AIN service records corresponding to the "800" service customer based on the originally dialed "800" number, and executes them to generate AIN service instructions. The AIN-equipped SSP 126 then completes the original call according to the AIN service instructions contained in the AIN response. The incremental post dial delay for the double query architecture of system 100 is estimated to be less than one second for the "800" and AIN queries, plus the signaling delay between the initial "800" querying SSP 130 and the AIN-equipped SSP 126 associated with the LEC POP 120. If SS7 signaling is carried out between SSP 130 and AIN-equipped SSP 126, the total average incremental delay is estimated to be approximately one second.

The graphical creation, validation, and network testing capabilities of the SPACE ® application can be used to quickly create a variety of customized AIN services for each standard IN/1 "800" service customer. Use of the SPACE ® application is described in commonly-assigned U.S. patent application Ser. No. 07/972,817, the content of which is hereby incorporated by reference. A particular "800" service customer's records can be provisioned by first using the SPACE ® application to create the AIN service records in the AIN services data base 174 and then using the SMS/800 application to create the turnaround record in the "800" services data base 154. This sequence provides the opportunity to test the AIN services using the SPACE ® application before the services are network-enabled via the turnaround record. In addition, this sequence provides orderly transitioning of each customer from the standard IN/1 "800" system to the AIN-capable "800" system of the present invention, because it is only necessary to replace the customer's existing "800" service record with a turnaround record after the AIN services have been fully provisioned, thereby avoiding a prolonged interruption in "800" service.

The system of the present invention can be used to provide all evolving AIN service features to standard IN/1 "800" service customers as they become available. As one example, the SPACE ® application may be used to create AIN service records containing instructions for caller interaction, enabling "800" calls to be routed based on caller dual-tone multi-frequency (DTMF) input. Other AIN service records may provide more robust routing features, such as the ability to route over both private facilities and the public switched telephone network. AIN service records may also include other evolving AIN features such as, for example, serial triggering and the ability to monitor network resources. Serial triggering refers to the ability to trigger sequentially within call processing based on various criteria, such as trunk group busy/idle states. The flexibility and ease of the SPACE ® application, made available to standard IN/1 "800" service customers by the system of the present invention, enables practical provisioning of customized sets of AIN features for each standard IN/1 "800" service customer.

The double-query architecture of system 100 provides additional flexibility in terms of the specific deployment options available to a LEC. For example, the system 100 could be deployed LATA-wide by simply establishing the LEC POP 120 and configuring end offices to route to the LEC POP. The double-query architecture of system 100 could be further extended by implementation in a regional or national area of service. A regional service architecture could be implemented, for example, by establishing a LEC POP per LATA, with an associated AIN services data base 174 also provided within the LATA. Alternatively, the regional service architecture may have multiple LEC POPs accessing a shared AIN services database. A national service architecture could be implemented, for example, by extending the regional architecture to have LEC POPs in different LATAs that query AIN services data bases in other LATAs. Depending upon the degree of data base sharing, at least a portion of an AIN services data base could be replicated in appropriate data bases using multiple data base record distribution features available, for example, in a future version of the SPACE ® application.

Figure 2:
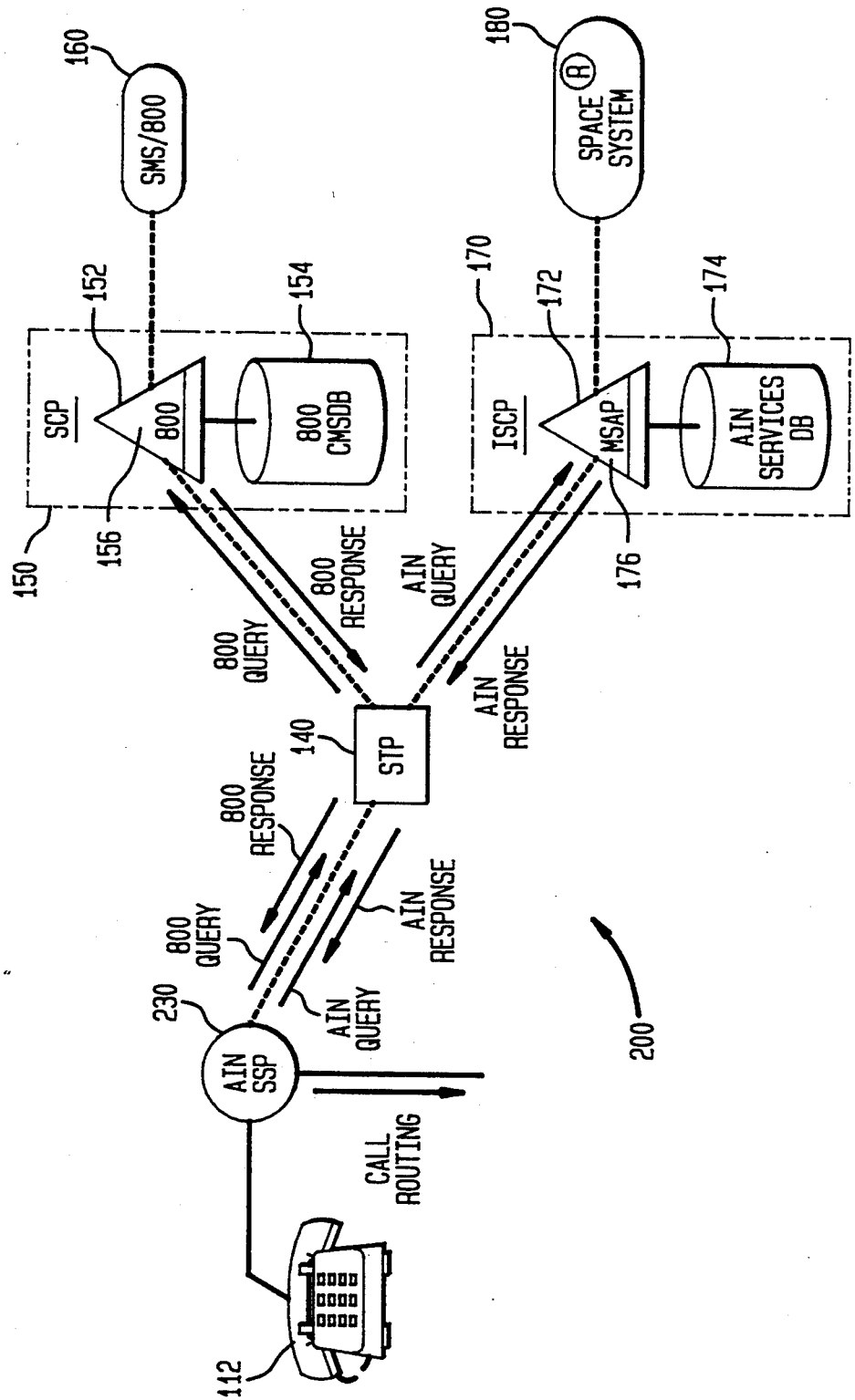
FIG. 2 is a block diagram of a second embodiment of a system for providing customized AIN services to standard IN/1 "800" service customers.

As herein embodied and shown in FIG. 2, a second embodiment of the system of the present invention, designated generally by reference numeral 200, retains the double query architecture, but provides a more efficient implementation configured to launch both the "800" query and the AIN query from a single AIN-equipped SSP 230. The AIN SSP 230 is equipped with both AIN and IN/1 "800" triggering capabilities. The system 200 of this second embodiment saves facilities and switching resources, and reduces post-dial delay by eliminating the need for a separate LEC POP facility.

When a telephone call directed to a standard IN/1 "800" service customer is received, AIN SSP 230 recognizes "800" service triggers within the call and generates the initial "800" query. STP 140 receives the "800" query from AIN SSP 230 and transmits the query to SCP 150. In response to the "800" query, the SCP processor 152, running the "800" service application 156, locates an "800" service record in "800" services data base 154, and executes the service record to generate the "800" response. As in the first embodiment, each of the "800" service records in data base 154 includes a turnaround record, created by SMS 160.

Based on a LEC CIC in the turnaround record, the "800" response directs the AIN SSP 230 to route the call via a trunk group having an appropriate AIN call model trigger. Because AIN SSP 230 is itself AIN-equipped, however, it is not necessary to route to a LEC POP facility to launch the AIN query. Rather, the AIN-equipped SSP 230 generates the AIN query itself, for example, by routing to a "loop-around" trunk group (not shown) that both originates and terminates at the AIN SSP 230. The loop-around arrangement enables the AIN SSP 230 to treat the terminating calls in the trunk group as AIN calls. The loop-around arrangement can be used with the present set of SSP capabilities without changing the SSP "800" and AIN call processing logic. However, with changes to the SSP call processing logic, more efficient arrangements are possible.

In response to the AIN query generated by AIN SSP 230 and received via STP 140, the ISCP processor 172, running the AIN services application (MSAP) 176, locates AIN service records in the AIN services data base 174 that correspond to the "800" service customer and generates the AIN response containing instructions for completing the call. The SSP 230 then routes the original call via a trunk group designated by the AIN service instructions and completes the call according to the AIN service instructions. Thus, AIN SSP 230 does not route the call to another switching element until after it has received both the "800" response and the AIN response.

Figure 3:
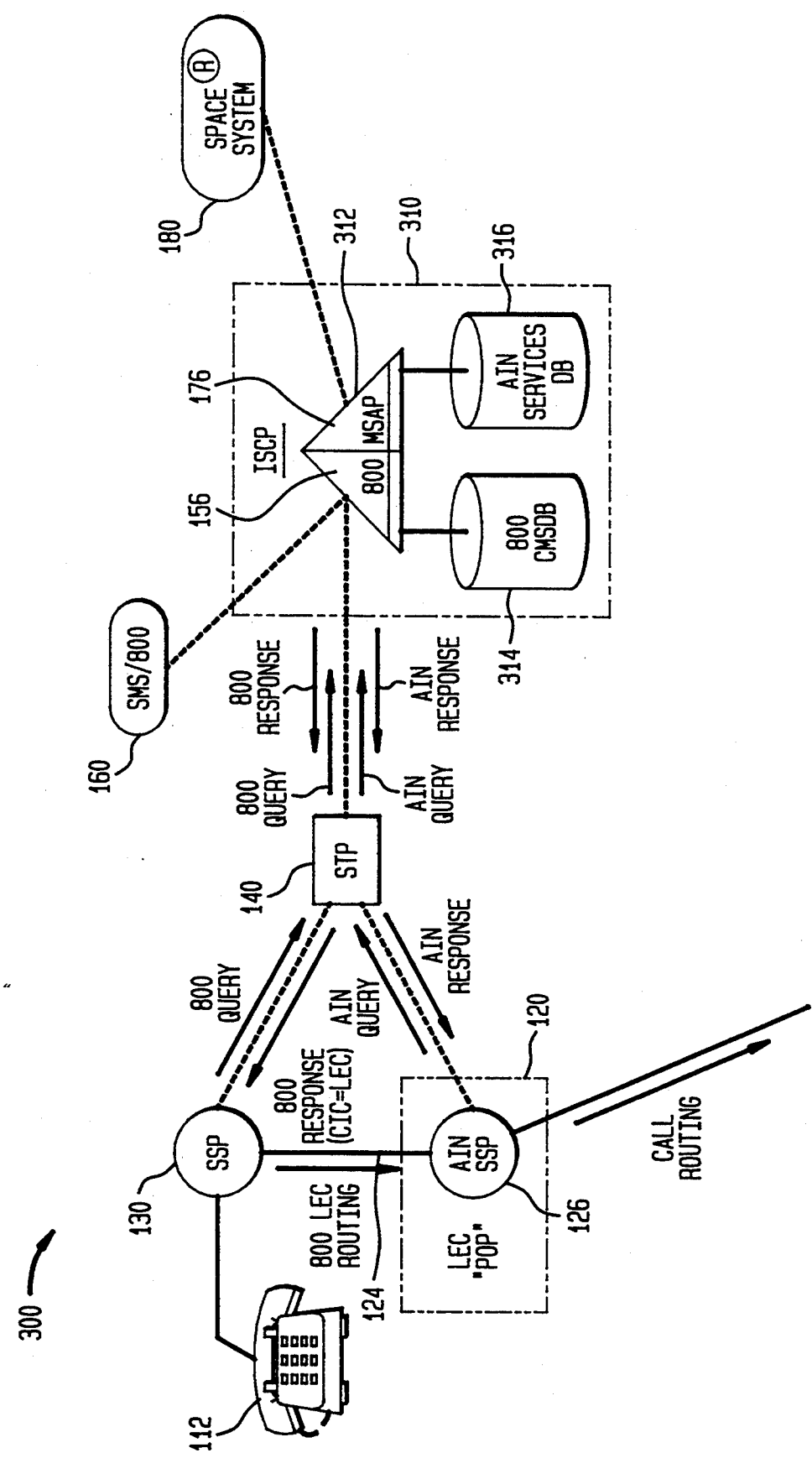
FIG. 3 is a block diagram of a third embodiment of a system for providing customized AIN services to standard IN/1 "800" service customers.

As herein embodied and shown in FIG. 3, a third embodiment of the system of the present invention, designated generally by reference numeral 300, employs a consolidated AIN/800 ISCP 310. The ISCP 310 includes a processor 312 running both the IN/1 "800" services application 156 and the AIN services application 176. These applications 156, 176 handle, respectively, "800" queries to an "800" CMSDB 314 and AIN queries to an AIN services data base 316. The processor 312 makes use of a multi-application configuration, in which the "800" services application 156 coexists with the AIN services application (MSAP) 176, to consolidate SCP resources while retaining the double-query architecture and the IN/1 SSP "800" triggering arrangement described with reference to FIG. 1. The logical architecture of system 300 preserves the independent use of "800" and AIN service capabilities, requires no changes to the switch/SCP message interfaces, e.g., transaction capabilities application protocol (TCAP), for either the "800" or AIN services, and is consistent with the planned AIN switch call model/-trigger evolution. According to this third embodiment, an IN/1 SSP 130 generates the "800" query to the ISCP 310, via STP 140, in response to "800" service triggers within the call received from telephone 112. The ISCP processor 312, running "800" services application 156, receives the "800" query and locates a corresponding "800" service record in the "800" CMSDB 314.

As in the first and second embodiments, an SMS 160 is used to create a turnaround record in the "800" service record in "800" CMSDB 314, and an SMS 180 is used to create and modify AIN service records in AIN services data base 316. The ISCP processor 312 generates an "800" response that includes a CIC specified by the turnaround record, and the IN/1 SSP 130 routes the call to a LEC POP 120 via trunk group 124 according to the CIC. The AIN-equipped SSP 126 of LEC POP 120 then launches an AIN query to the consolidated AIN/800 ISCP 310. Thus, the "800" and AIN queries are directed to the same ISCP 310. The ISCP processor 312, running the AIN services application 176, locates one or more AIN service records in the AIN services data base 316 based on the originally dialed "800" number and executes the AIN service records to generate the AIN response. The AIN-equipped SSP 126 associated with LEC POP 120 completes the call according to the service instructions in the AIN response.

Figure 4:
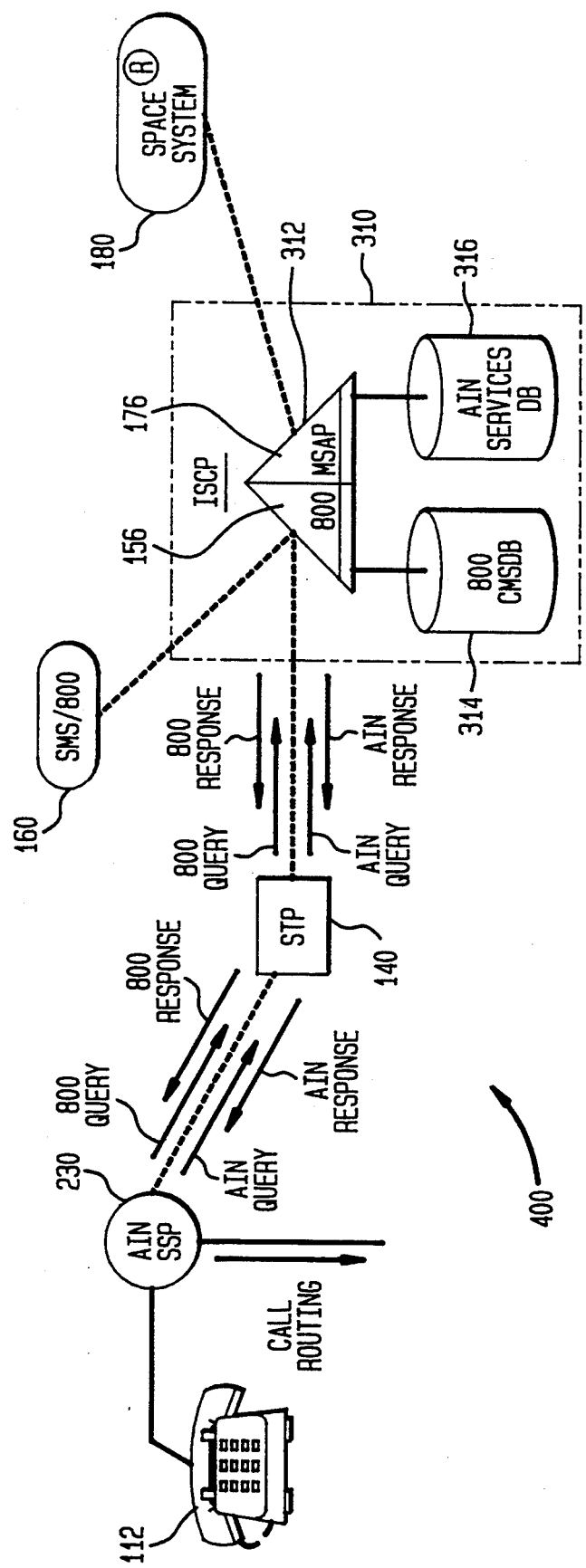
FIG. 4 is a block diagram of a fourth embodiment of a system for providing customized AIN services to standard IN/1 "800" service customers.

As herein embodied and shown in FIG. 4, a fourth embodiment of the system of the present invention, designated generally by reference numeral 400, provides a single AIN SSP 230 equipped with both AIN and IN/1 "800" triggering capabilities, as in the second embodiment described with reference to FIG. 2, in combination with a consolidated, multi-application AIN/800 ISCP 310. As in the third embodiment shown in FIG. 3, the AIN/800 ISCP 310 includes a processor 312 running both the IN/1 "800" services application 156 and the AIN services application 176. The system 400 combines certain advantages of exemplary systems 200 and 300 described with reference to the second and third embodiments, respectively. Specifically, by eliminating the need to route to a LEC POP, system 400 saves facilities and switching resources and reduces post-dial delay. Further, with the multi-application configuration of ISCP 310, system 400 consolidates SCP resources.

According to this fourth embodiment, the AIN-equipped SSP 230 generates the "800" query to the consolidated AIN/800 ISCP 310 in response to "800" service triggers within the call received from telephone 112. The AIN/800 ISCP processor 312, running the "800" service application 156, responds by locating the corresponding "800" service record in the "800" CMSDB 314 and generating an "800" response according to the turnaround record contained in the "800" service record. The "800" response directs the AIN SSP 230 to route the call to an AIN-equipped trunk group. Instead of routing to a LEC POP, however, the AIN SSP 230 utilizes, for example, a loop-around trunk arrangement for the AIN-equipped trunk group. In response to a call terminating on the loop-around trunk group, AIN SSP 230 generates the AIN query to the consolidated AIN/800 ISCP 310. The AIN/800 ISCP processor 312, running the AIN service application 176, executes the AIN service records stored in the AIN services data base 316 for the appropriate "800" service customer and generates the AIN response. The AIN-equipped SSP 230 then routes the original call via a trunk group designated in the AIN response and completes the call according to the AIN service instructions contained in the AIN response.

The foregoing description describes exemplary structural embodiments of the present invention. However, the present invention is not limited to such structural configurations, but also includes methods for providing AIN services to standard IN/1 "800" service customers. Although some of the methods of the present invention are described above with respect to structural configurations in which they may be implemented, the present invention also contemplates broader methods, as described below.

Figure 5:
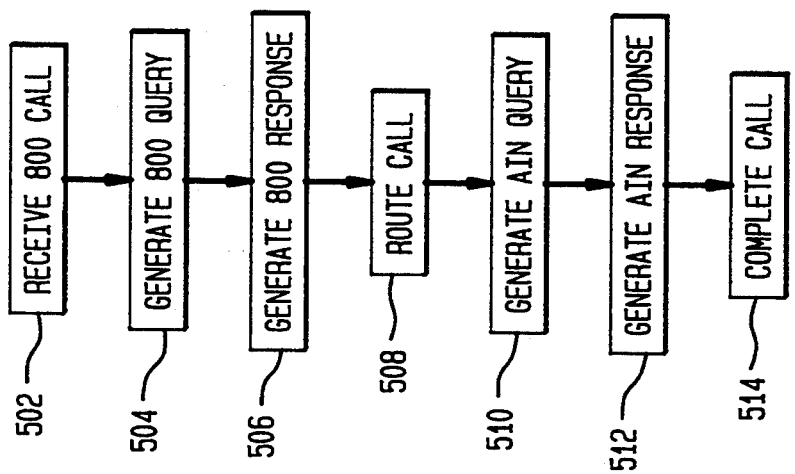
FIG. 5 is a flow diagram illustrating one embodiment of a method for providing customized AIN services to standard IN/1 "800" service customers.

A first exemplary embodiment of the method of the present invention is shown in FIG. 5. As herein embodied and shown in FIG. 5, the method includes a first step of receiving, in a telephone network, a call from a telephone directed to a standard IN/1 "800" service customer (step 502). An "800" query is then generated (step 504). In response to the "800" query, the method provides the step of generating an "800" response containing a CIC specified in a turnaround record contained in an "800" service record that corresponds to the standard IN/1 "800" service customer (step 506). The call is then routed via a trunk group designated by the CIC (step 508), followed by the step of generating an AIN query (step 510). In response to the AIN query, at least one AIN service record corresponding to the standard IN/1 "800" service customer is executed, to generate an AIN response (step 512), containing service instructions for completing the call (step 514).

Figure 6:
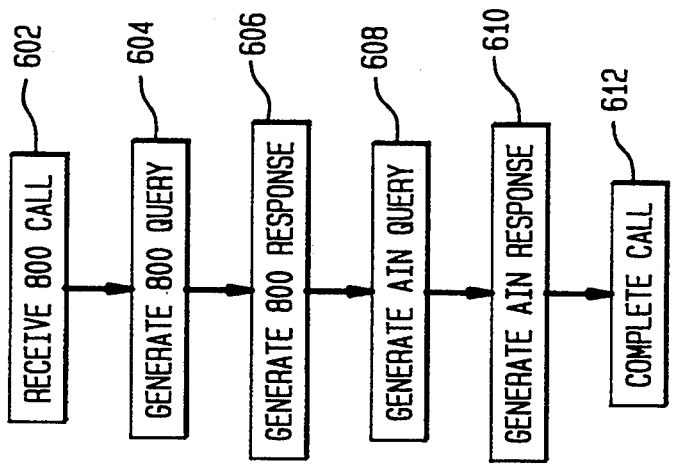
FIG. 6 is a flow diagram illustrating a second embodiment of a method for providing customized AIN services to standard IN/1 "800" service customers.

A second exemplary embodiment of the method of the present invention is shown in FIG. 6. As herein embodied and shown in FIG. 6, the method includes a first step of receiving, in a telephone network, a call from a telephone directed to a standard IN/1 "800" service customer (step 602). An "800" query is then generated (step 604). In response to the "800" query, the method provides the step of generating an "800" response that contains instructions for carrying out an AIN query based on an "800" service record for the standard IN/1 "800" service customer (step 606). An AIN query is then generated (step 608) and, in response to the AIN query, at least one AIN service record corresponding to the standard IN/1 "800" service customer is executed to generate an AIN response containing AIN service instructions (step 610). The call is then routed via a trunk group designated by the AIN response, and the call is completed according to the AIN service instructions provided in the AIN response (step 612).

Having described the presently preferred embodiments of the invention, additional advantages and modifications will readily occur to those skilled in the art from consideration of the specification and practice of the invention disclosed herein. Therefore, it is intended that the specification and examples be considered as exemplary only, with the true scope and spirit of the invention being indicated by the following claims.

I claim:

1. In a telephone network, a system for providing customized advanced intelligent network (AIN) services to standard intelligent network (IN/1) "800" service customers, the system comprising:
   an IN/1-equipped service switching point (IN/1 SSP) for receiving a call directed to a standard IN/1 "800" service customer;
   an IN/1-equipped "800" service control point ("800" SCP) coupled to the IN/1 SSP;
   an AIN-equipped service switching point (AIN SSP) coupled to the IN/1 SSP; and
   an AIN-equipped service control point (AIN SCP) coupled to the AIN SSP,
   wherein the IN/1 SSP generates an "800" query in response to the received call, the "800" SCP generates, in response to the "800" query, an "800" response corresponding to the standard IN/1 "800" service customer, the AIN SSP generates an AIN query based on the "800" response, the AIN SCP generates, in response to the AIN query, an AIN response containing instructions for completing the call, and the AIN SSP completes the call according to the instructions contained in the AIN response.

2. The system of claim 1, wherein the "800" SCP generates the "800" response according to an "800" service record stored in an "800" services data base associated with the "800" SCP, and the AIN SCP generates the AIN response according to at least one AIN service record stored in an AIN services data base associated with the AIN SCP.

3. The system of claim 1, wherein the call directed to the standard IN/1 "800" service customer is initiated by an originally dialed "800" number, and the AIN SCP selects the at least one AIN service record to be executed by the AIN SCP based on the originally dialed "800" number.

4. In a telephone network, a system for providing customized advanced intelligent network (AIN) services to standard intelligent network (IN/1) "800" service customers, the system comprising:
   an IN/1-equipped service switching point (IN/1 SSP) for receiving a call directed to a standard IN/1 "800" service customer, and for generating an "800" query in response to the received call;
   an IN/1-equipped "800" service control point ("800" SCP) for generating, in response to the "800" query, an "800" response containing an identification code specified in an "800" service record corresponding to the standard IN/1 "800" service customer, wherein the IN/1 SSP routes the call via a trunk group designated by the identification code;
   an AIN-equipped service switching point (AIN SSP), associated with the trunk group designated by the identification code, for receiving the call routed from the IN/1 SSP, and for generating an AIN query in response to the received call; and
   an AIN-equipped service control point (AIN SCP) for executing, in response to the AIN query, at least one AIN service record corresponding to the standard IN/1 "800" service customer, and for generating an AIN response containing instructions based on the execution of the at least one AIN service record, wherein the AIN SSP completes the call according to the instructions generated by the AIN SCP.

5. The system of claim 4, wherein the "800" service record is stored in an "800" services data base associated with the "800" SCP, and the at least one AIN service record is stored in an AIN services data base associated with the AIN SCP.

6. The system of claim 4, wherein the call directed to the standard IN/1 "800" service customer is initiated by an originally dialed "800" number, and the AIN SCP selects the at least one AIN service record to be executed by the AIN SCP based on the originally dialed "800" number.

7. In a telephone network, a system for providing customized advanced intelligent network (AIN) services to standard intelligent network (IN/1) "800" service customers, the system comprising:
   an AIN-equipped service switching point (AIN SSP) for receiving a call directed to a standard IN/1 "800" service customer, and for generating an "800" query in response to the received call;
   an IN/1-equipped "800" service control point ("800" SCP) for generating, in response to the "800" query, an "800" response according to an "800" service record corresponding to the standard IN/1 "800" service customer, wherein the AIN SSP generates an AIN query in response to the "800" response; and
   an AIN-equipped service control point (AIN SCP) for executing, in response to the AIN query, at least one AIN service record corresponding to the standard IN/1 "800" service customer, and for generating an AIN response containing instructions based on the execution of the at least one AIN service record, wherein the AIN SSP completes the call according to the AIN response generated by the AIN SCP.

8. The system of claim 7, wherein the "800" service record is stored in an "800" services data base associated with the "800" SCP, and the at least one AIN service record is stored in an AIN services data base associated with the AIN SCP.

9. The system of claim 7, wherein the call directed to the standard IN/1 "800" service customer is initiated by an originally dialed "800" number, and the AIN SCP selects the at least one AIN service record to be executed by the AIN SCP based on the originally dialed "800" number.

10. In a telephone network, a system for providing customized advanced intelligent network (AIN) services to standard intelligent network (IN/1) "800" service customers, the system comprising:
   an IN/1-equipped service switching point (IN/1 SSP) for receiving a call directed to a standard IN/1 "800" service customer, and for generating an "800" query in response to the received call;
   an AIN/800-equipped service control point (AIN/800 SCP) for generating, in response to the "800" query, an "800" response containing an identification code specified in an "800" service record corresponding to the standard IN/1 "800" service customer, wherein the IN/1 SSP routes the call via a trunk group designated by the identification code; and
   an AIN-equipped service switching point (AIN SSP), associated with the trunk group designated by the "800" response, for receiving the call routed from the IN/1 SSP, and for generating an AIN query in response to the received call, wherein the AIN/800 SCP executes, in response to the AIN query, at least one AIN service record corresponding to the standard IN/1 "800" service customer, and generates an AIN response containing instructions based on the execution of the at least one AIN service record, and wherein the AIN SSP completes the call according to the instructions generated by the AIN/800 SCP.

11. The system of claim 10, wherein the "800" service record is stored in an "800" services data base and the at least one AIN service record is stored in an AIN services data base, both the "800" services data base and the AIN services data base being associated with the AIN/800 SCP.

12. The system of claim 10, wherein the call directed to the standard IN/1 "800" service customer is initiated by an originally dialed "800" number, and the AIN/800 SCP selects the at least one AIN service record to be executed by the AIN/800 SCP based on the originally dialed "800" number.

13. In a telephone network, a system for providing customized advanced intelligent network (AIN) services to standard IN/1 "800" service customers, the system comprising:
   an AIN-equipped service switching point (AIN SSP) for receiving a call directed to a standard IN/1 "800" service customer, and for generating an "800" query in response to the received call; and
   an AIN/800-equipped service control point (AIN/800 SCP) for generating, in response to the "800" query, an "800" response according to an "800" service record corresponding to the standard IN/1 "800" service customer, wherein the AIN SSP generates an AIN query in response to the identification code, wherein the AIN/800 SCP executes, in response to the AIN query, at least one AIN service record corresponding to the standard IN/1 "800" service customer, and generates an AIN response containing instructions based on the execution of the at least one AIN service record, and wherein the AIN SSP completes the call according to the AIN response generated by the AIN/800 SCP.

14. The system of claim 13, wherein the "800" service record is stored in an "800" services data base and the at least one AIN service record is stored in an AIN services data base, both the "800" services data base and the AIN services data base being associated with the AIN/800 SCP.

15. The system of claim 13, wherein the call directed to the standard IN/1 "800" service customer is initiated by an originally dialed "800" number, and the AIN/800 SCP selects the at least one AIN service record to be executed by the AIN/800 SCP based on the originally dialed "800" number.

16. A method for providing, in a telephone network, customized advanced intelligent network (AIN) services to standard intelligent network (IN/1) "800" service customers, the method comprising the steps of:
   receiving a call directed to a standard IN/1 "800" service customer;
   generating an "800" query in response to the received call;
   generating, in response to the "800" query, an "800" response including an identification code specified in an "800" service record corresponding to the standard IN/1 "800" service customer;
   routing the call via a trunk group designated by the identification code;
   generating an AIN query in response to the routing of the call;
   executing, in response to the AIN query, at least one AIN service record corresponding to the standard IN/1 "800" service customer;
   generating an AIN response including instructions based on the execution of the at least one AIN service record; and
   completing the call according to the instructions.

17. The method of claim 16, wherein the received call is initiated by an originally dialed "800" number, and the at least one AIN service record to be executed is selected based on the originally dialed "800" number.

18. A method for providing, in a telephone network, customized advanced intelligent network (AIN) services to standard intelligent network (IN/1) "800" service customers, the method comprising the steps of:
   receiving a call directed to a standard IN/1 "800" service customer;
   generating an "800" query in response to the received call;
   generating, in response to the "800" query, an "800" response according to an "800" service record corresponding to the standard IN/1 "800" service customer;
   generating an AIN query in response to the "800" response;
   executing, in response to the AIN query, at least one AIN service record corresponding to the standard IN/1 "800" service customer;
   generating an AIN response including instructions based on the execution of the at least one AIN service record; and
   completing the call according to the instructions.

19. The method of claim 18, wherein the received call is initiated by an originally dialed "800" number, and the at least one AIN service record to be executed is selected based on the originally dialed "800" number.

* * * * *